(12) United States Patent
Yamada et al.

(10) Patent No.: US 7,686,880 B2
(45) Date of Patent: Mar. 30, 2010

(54) PROCESS FOR PRODUCING PIGMENT COMPLEX AND PIGMENT-CONTAINING COMPOSITION

(75) Inventors: Kenji Yamada, Yokohama (JP); Shoji Ihara, Yokohama (JP); Takayuki Teshima, Yokohama (JP); Hirokatsu Miyata, Hadano (JP); Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 11/228,282

(22) Filed: Sep. 19, 2005

(65) Prior Publication Data

US 2006/0060109 A1    Mar. 23, 2006

(30) Foreign Application Priority Data

Sep. 22, 2004   (JP)   ............................. 2004-275590

(51) Int. Cl.
*C09B 67/20* (2006.01)
*C09D 11/00* (2006.01)
*C09B 67/08* (2006.01)
*C09B 67/46* (2006.01)

(52) U.S. Cl. .................. 106/400; 106/311; 106/493

(58) Field of Classification Search .................. 106/400, 106/311, 493
See application file for complete search history.

(56) References Cited

U.S. PATENT DOCUMENTS 5,085,698 A     2/1992   Ma et al. ....................... 106/20

FOREIGN PATENT DOCUMENTS

| JP | 40-028776 | 1/1992 |
| JP | 2002-138229 | 5/2002 |
| JP | 2002-285032 | 10/2002 |
| JP | 2004045654 A * | 2/2004 |
| JP | 2004144787 A * | 5/2004 |

OTHER PUBLICATIONS

Translation to Shibai et al. (JP 2004045654) Feb. 2004.*
O. W. Webster, "Living Polymerization Methods," *Science*, New Series, vol. 251, No. 4996, pp. 887-893 (1991).

* cited by examiner

*Primary Examiner*—Kelechi C Egwim
(74) *Attorney, Agent, or Firm*—Fitzpatrick, Cella, Harper & Scinto

(57) ABSTRACT

A process for producing a pigment complex including the steps of dissolving a pigment in a supercritical state or sub-critical state fluid and contacting the fluid containing the dissolved pigment with a polymer-containing solution.

8 Claims, 3 Drawing Sheets

PROCESS FOR PRODUCING PIGMENT COMPLEX AND PIGMENT-CONTAINING COMPOSITION

BACKGROUND OF THE INVENTION

1. Field of the Invention

The present invention relates to process for producing a pigment complex and a pigment-containing composition. The present invention particularly relates to a process for producing a pigment complex and a pigment-containing composition which possess good dispersion stability over a long period of time, and which have a small and uniform particle size.

2. Related Background Art

Inkjet recording systems, as a direct recording system, is highly characterized in that such systems are compact and have low power consumption. In addition, due to nozzle miniaturization, improvements in image quality and high-speed printing are rapidly progressing. One example of inkjet technology is a method which forms an image on a recording medium by heating ink supplied from an ink tank with a heater in the nozzle to vaporize and foam the ink, and thereby ejected. Another example is a method which ejects ink from a nozzle by vibrating a piezo element.

Since the ink used in such methods is usually an aqueous dye solution, in some cases phenomena are manifested such as bleeding, which occurs when colors are superimposed on each other, or feathering in the fiber direction of the paper at a recording location on the recording medium.

The use of a pigment dispersion ink in order to improve these matters is being investigated. For example, Japanese Patent Application Laid-Open No. H4-28776 discloses an ink which uses a pigment in place of a dye. U.S. Pat. No. 5,085,698 discloses an ink in which a pigment has been dispersion-stabilized using a polymer dispersing agent, and it was confirmed that light resistance, water resistance and fixing properties showed a substantial improvement compared with the case of a dye. The pigments used in these inks are obtained by a process which mechanically finely pulverizes an agglomeration of an ordinary commercially available pigment using a ball mill or other such disperser. For this reason, the average particle size of such fine pulverized pigments is usually greater than about 100 nm (0.1 μm), and further, the particle size distribution is comparatively broad.

In contrast, Japanese Patent Application Laid-Open Nos. 2002-285032 and 2002-138229 disclose methods for producing a pigment having a particle size of 100 nm or less through the crystallization of a pigment dissolved in a supercritical fluid.

As stated above, since pigments possess advantageous effects compared with dyes, their use has been widely investigated. In recent years, finer, more colorful and stronger tinting pigment inks are being demanded. It is thought that to realize such finer inks having excellent purity that it would be preferable to employ small and uniform pigment particles as the ink composition. However, it is extremely difficult to reduce the size of the obtained primary particles in the above-described pigment fine pulverizing process carried out using a disperser. Therefore, since the particle size distribution of the pulverized particles is broad, there has thus been the problem that large pigment particles would block the inkjet nozzles. In view of such a problem, a pigment is desired which doesn't contain large particle size pigment particles, and which has a small and uniform particle size distribution.

With the above-described fine pulverization using a disperser, there is also a drawback that a process taking up time and money is required. In addition, because pigments are essentially insoluble in water, even the above-described small-size pigments which employed a supercritical fluid have in fact in-sufficient dispersion stability able to withstand actual use.

SUMMARY OF THE INVENTION

Accordingly, it is an object of the present invention to provide a process for producing a pigment complex and a pigment-containing composition which possess an extremely high pigment dispersion stability and which have a small and uniform particle size.

It is also an object of the present invention to provide a process for producing a pigment complex and a pigment-containing composition which is effective as a color material disperse ink material having excellent color purity and tinting strength.

The process for producing a pigment complex provided by the present invention comprises the steps of dissolving a pigment in a supercritical state or subcritical state fluid and contacting the fluid containing the dissolved pigment with a polymer-containing solution. Further, the process for producing a pigment-containing composition provided by the present invention comprises the steps of dissolving a pigment in a supercritical state or subcritical state fluid and contacting the fluid containing the dissolved pigment with a polymer-containing solution.

According to the present invention, a process for producing a pigment complex and a pigment-containing composition can be provided which possess extremely high pigment dispersion stability, and which have a small and uniform particle size.

In addition, the present invention can also provide a process for producing a pigment complex and a pigment-containing composition which are effective as a color material disperse ink material having excellent color purity and tinting strength.

DESCRIPTION OF THE PREFERRED EMBODIMENTS

Figure 1:
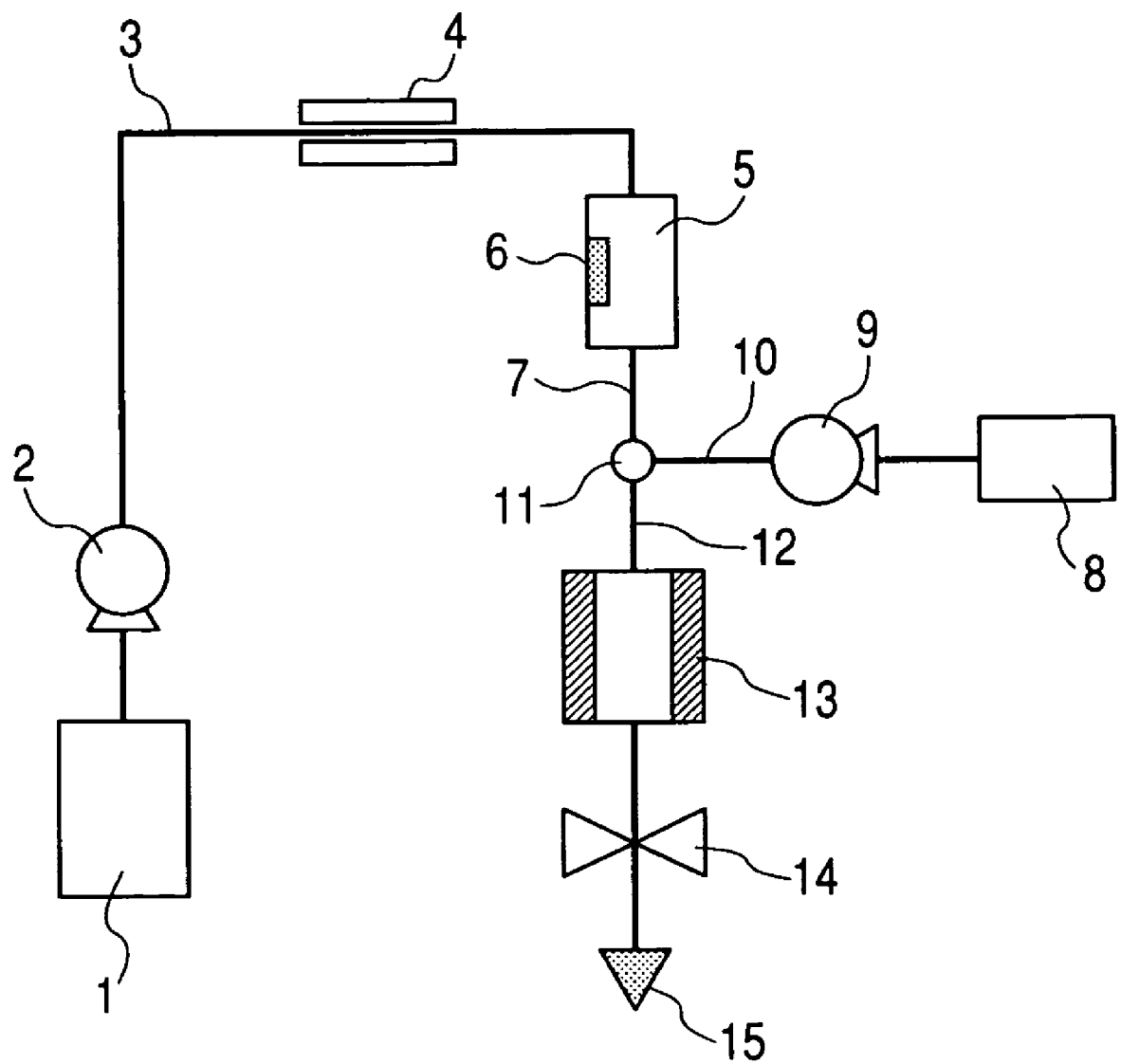
FIG. 1 is a schematic diagram illustrating one example of a pigment complex production apparatus which realizes the process according to the present invention.

The process for producing the pigment complex provided by the present invention comprises the steps of dissolving a pigment in a supercritical state or subcritical state fluid, and contacting the fluid containing the dissolved pigment with a polymer-containing solution.

In the present invention, the above-described contacting step can be such that the fluid containing the dissolved pigment is released into the polymer-containing solution.

The present invention also comprises carrying out the above-described contacting step having undergone a step in which, after the step for dissolving the pigment in a supercritical state or subcritical state fluid, the fluid containing the dissolved pigment is made to leave the supercritical state or subcritical state.

In the present invention it is possible to use a block copolymer or a graft copolymer as the polymer.

In the present invention, at least one component of the block copolymer or graft copolymer can be made to have affinity with the solvent of the polymer-containing solution.

In the present invention, the block copolymer or the graft copolymer preferably has an essentially monodispersed molecular weight distribution.

In the present invention, the block copolymer or the graft copolymer preferably has a polydispersity index Mw/Mn of not more than 1.7.

The present invention comprises a process for producing a pigment-containing composition which comprises the steps of dissolving a pigment in a supercritical state or subcritical state fluid, and contacting the fluid containing the dissolved pigment with a polymer-containing solution.

The first step in the production process of a pigment complex and pigment-containing composition according to the present invention is the step of dissolving a pigment into a supercritical state or subcritical state fluid.

The term "supercritical state" as used herein refers to a state at or above critical temperature, and, at or above critical pressure.

The term "subcritical state" refers to the state in which one of either temperature or pressure has reached critical temperature or critical pressure, while the other has not reached critical temperature or critical pressure. The term "subcritical state" can also refer to the state where neither of temperature or pressure has reached a critical temperature or critical pressure, but at least one of temperature or pressure is much higher than normal temperature or pressure and is close to critical temperature or critical pressure.

Representative examples of the material which is used as the supercritical state or subcritical state fluid include water and carbon dioxide. Other examples include alcohols such as methanol and ethanol, ketones such as acetone and methylethylketone, as well as ethers, esters, aromatics and the like. However, the solvents which can be used in the present invention are not limited to these examples. It is also possible to mix a plurality of these materials together. For example, water becomes supercritical at a temperature of 374° C. or greater and pressure of 22 MPa or higher, acetone at 235° C. or greater and 4.7 MPa or higher, methanol at 240° C. or greater and 7.9 MPa or higher, ethanol at 243° C. or greater and 6.3 MPa or higher, and carbon dioxide at 31° C. or greater and 7.3 MPa or higher. Including water, the above-described solvents can be used as a mixed solvent or as a single solvent. In some cases, an appropriate amount of an additive may be added to improve pigment solubility. One example of the additive is an acid such as sulfuric acid and trifluoroacetic acid.

The type of the pigment used in the present invention is not particularly limited, a commonly known pigment can be used. Examples include phthalocyanine pigments such as a metalfree phthalocyanine, copper phthalocyanine, halogenated copper phthalocyanine, titanyl phthalocyanine and the like; azo pigments such as insoluble azo pigments, condensed azo pigments, azo lakes, chelate azo pigments and the like; quinacridon pigments; isoindolinone pigments; indanthrone pigments; diketopyrrolopyrrole pigments; dioxazine pigments; perylene pigments; anthraquinone pigments and the like. However, usable pigments are not limited to these examples.

As the above-described pigments, commercially available pigments may be used. Examples of commercially available pigments for black, cyan, magenta and yellow are listed below.

Black pigments include the following: Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II and Raven 1190 ULTRA II (these compounds manufactured by Columbian Carbon Co., Ltd.); Black Pearls L, MOGUL-L, Regal 400R, Regal 660R, Regal 330R, Monarch 800, Monarch 880, Monarch 900, Monarch 1000, Monarch 1300 and Monarch 1400 (these compounds manufactured by Cabot Corporation); Color Black FW1, Color Black FW2, Color Black FW200, Color Black 18, Color Black S160, Color Black S170, Special Black 4, Special Black 4A, Special Black 6, Printex 35, Printex U, Printex 140U, Printex V and Printex 140V (these compounds manufactured by Degussa Co., Ltd); and No. 25, No. 33, No. 40, No. 47, No. 52, No. 900, No. 2300, MCF-88, MA 600, MA 7, MA 8 and Ma 100 (these compounds manufactured by Mitsubishi Chemical Corporation). However, the black pigments are not limited to these examples.

Cyan pigments include the following: C.I Pigment Blue-1, C.I Pigment Blue-2, C.I Pigment Blue-3, C.I Pigment Blue-15, C.I Pigment Blue-15:2, C.I Pigment Blue-15:3, C.I Pigment Blue-15:4, C.I Pigment Blue-16, C.I Pigment Blue-22 and C.I Pigment Blue-60. However, the cyan pigments are not limited to these examples.

Magenta pigments include the following: C.I Pigment Red-5, C.I Pigment Red-7, C.I Pigment Red-12, C.I Pigment Red-48, C.I Pigment Red-48:1, C.I Pigment Red-57, C.I Pigment Red-112, C.I Pigment Red-122, C.I Pigment Red-123, C.I Pigment Red-146, C.I Pigment Red-168, C.I Pigment Red-184, C.I Pigment Red-202 and C.I Pigment Red-207. However, the magenta pigments are not limited to these examples.

Yellow pigments include the following: C.I Pigment Yellow-12, C.I Pigment Yellow-13, C.I Pigment Yellow-14, C.I Pigment Yellow-16, C.I Pigment Yellow-17, C.I Pigment Yellow-74, C.I Pigment Yellow-83, C.I Pigment Yellow-93, C.I Pigment Yellow-95, C.I Pigment Yellow-97, C.I Pigment Yellow-98, C.I Pigment Yellow-114, C.I Pigment Yellow-128, C.I Pigment Yellow-129, C.I Pigment Yellow-151 and C.I Pigment Yellow-154. However, the yellow pigments are not limited to these examples.

The polymer-containing solution which is brought into contact with the solution containing the pigment will now be explained. As the polymer for coating the pigment which can be used in the present invention, in particular, an amphiphilic block copolymer and an amphiphilic graft copolymer are preferably used. Examples of a block copolymer include an A-B type block copolymer consisting of a hydrophilic block (block A) and a hydrophobic block (block B), an A-B-A type and B-A-B type block copolymer, and a multiblock copolymer consisting of three or more blocks and the like. Examples of a graft copolymer include a copolymer consisting of a hydrophobic component as the backbone and a hydrophilic component as a branch. In such a block copolymer or graft copolymer, a given component in the polymer has affinity with the solvent, whereby the polymer chain extends through the solvent. This contributes to the entropical and sterical stabilization of an aggregate in the solvent due to the resiliency of the polymer chains, and also to the dispersion stabilization of the pigment micro-particulate as a result of the pigment being entrained into the other component and thereby coated.

In the present invention, the above-described pigment fine particle coated with the polymer is referred to as a pigment complex. As the hydrophilic component of these block copolymers or graft copolymers, a polymer having a structure which contains a hydrophilic group is preferable. Examples of the hydrophilic group include, but are not limited to, a hydroxyl group, a carboxyl group and an amino group. Specific examples include the structures of poly(meth)acrylic acid, polyacrylamide, polymethacrylamide, polyvinylalcohol, polyvinylpyrrolidone, polyvinylpyridine, polymaleic acid, polystyrenesulfonic acid, polyethylene glycol and the like. These examples are not particularly limited, and may be either nonionic or ionic, as long as they possess a hydrophilic polymer structure. Such a polymer usually has a number average molecular weight of between 500 and 400,000, and preferably between 2,000 and 200,000. If the number average molecular weight is less than 500, the polymer may not be able to sufficiently express its role in dispersion stabilization. On the other hand, if the number average molecular weight exceeds 400,000, problems sometimes occur during production of the dispersion stabilizer.

Since it is required that the particle size of the pigment complex in the present invention is small and uniform, it is strongly desired that the polymer chain length of the coating polymer is also uniform. That is, it is especially preferable that the above-described block copolymer or graft copolymer is essentially monodispersed. In the present invention, a polymer that is monodispersed means a polymer having a sufficiently narrow molecular weight distribution. Specifically, the polydispersity index (Mw/Mn) is preferably not more than 1.7, and more preferably not more than 1.4. It has been confirmed that if the polydispersity index of the used polymer is greater than 1.7, the particle size distribution of the formed pigment complex tends to broaden.

The following substances may be used as such a narrow molecular weight distribution block copolymer or graft copolymer: commercially available polymers such as a polyoxyethylene-polyoxyalkylene type block copolymer as represented by a polypropylene glycol-polyethylene glycol type block copolymer, and a polypropylene glycol-polymaleic acid-type graft copolymer. In addition to these examples, the polymer can be appropriately produced by a living polymerization method, which is an effective synthetic method for polymers having controlled molecular weight and molecular weight distribution. In the present technological field, commonly known techniques such as living anionic polymerization, living cationic polymerization, living radical polymerization, living ring-opening polymerization and similar methods can be employed as the living polymerization method. However, the present invention is not limited to these methods, so that, for example, a living polymerization method such as that disclosed in Science, 1991, Vol. 251, p. 887 can be employed.

Monomers which can be used in the production of the above-descried polymer by living polymerization include the following commonly known polymerizable monomers. A non-limiting list of examples of such polymerizable monomers which can be used in a living anionic polymerization process include:

styrene, and α-, o-, m- and p-alkyl, alkoxyl, halogen, haloalkyl, nitro, cyano, amide, and ester substituents of styrene;

polymerizable unsaturated aromatic compounds such as styrene sulfonic acid, 2,4-dimethylstyrene, paradimethylaminostyrene, vinylbenzylchloride, vinylbenzaldehyde, indene, 1-methylindene, vinylnaphthalene, vinylanthracene, vinylcarbazole and 2-vinylfluorene;

alkyl(meth)acrylates such as methyl(meth)acrylate, ethyl (meth)acrylate, n-propyl(meth)acrylate, n-butyl(meth)acrylate, t-butyl(meth)acrylate, 2-ethylhexyl(meth)acrylate and stearyl(meth)acrylate;

unsaturated monocarboxylic acid esters such as methyl crotonate, ethyl crotonate, methyl cinnamate and ethyl cinnamate;

fluoroalkyl(meth)acrylates such as trifluoroethyl(meth) acrylate, pentafluoropropyl(meth)acrylate and heptafluorobutyl(meth)acrylate;

hydroxyl-group-containing (meth)acrylates protected by a trialkylsilyl group such as trimethylsiloxanyldimethylsilylpropyl(meth)acrylate, tris(trimethylsiloxanyl)silylpropyl (meth)acrylate and di(meth)acryloylpropyldimethylsilyl ether;

(meth)acrylonitriles;

conjugated dienes such as isoprene, 1,3-butadiene, 2,3-dimethyl-1,3-butadiene, 1,3-pentadiene, 1,3-hexadiene, 1,4-cyclohexadiene and the like.

A non-limiting list of examples of polymerizable monomers which can be used in a living cationic polymerization process include:

styrene, and α-, o-, m- and p-alkyl, alkoxyl, halogen, haloalkyl, nitro, cyano, amide, and ester substituents of styrene;

polymerizable unsaturated aromatic compounds such as styrene sulfonic acid, 2,4-dimethylstyrene, paradimethylaminostyrene, vinylbenzylchloride, vinylbenzaldehyde, indene, 1-methylindene, vinylnaphthalene, vinylanthracene, vinylcarbazole and 2-vinylfluorene;

monoalkylvinylethers represented by methylvinylether, ethylvinylether, n-propylvinylether, n-butylvinylether, tert-butylvinylether, isobutylvinylether, tert-amylvinylether, dodecylvinylether, octadecylvinylether, ethyleneglycol butylvinylether, triethyleneglycol ethylvinylether, 2-chloroethylvinylether, 2-ethylhexylvinylether, cyclohexylvinylether, aminopropylvinylether and 2-(diethylamino)ethylvinylether;

monoarylvinylethers represented by benzylvinylether, phenylvinylether, paratolylvinylether and naphthylvinylether;

hydroxyl-group-containing vinylethers such as butanediolmonovinylether, ethyleneglycol monovinylether, diethyleneglycol monovinylether, cyclohexanedimethanolmonovinylether and hexanediolmonovinylether;

isobutylene and the like.

A non-limiting list of examples of the polymerizable monomers which can be used in a living radical polymerization process include:

styrene, and α-, o-, m- and p-alkyl, alkoxyl, halogen, haloalkyl, nitro, cyano, amide, and ester substituents of styrene;

polymerizable unsaturated aromatic compounds such as styrene sulfonic acid, 2,4-dimethylstyrene, paradimethylaminostyrene, vinylbenzylchloride, vinylbenzaldehyde, indene, 1-methylindene, vinylnaphthalene, vinylanthracene, vinylcarbazole and 2-vinylfluorene;

alkyl(meth)acrylates such as methyl(meth)acrylate, ethyl (meth)acrylate, n-propyl(meth)acrylate, n-butyl(meth)acrylate, 2-ethylhexyl(meth)acrylate and stearyl(meth)acrylate;

unsaturated monocarboxylic acid esters such as methyl crotonate, ethyl crotonate, methyl cinnamate and ethyl cinnamate;

fluoroalkyl(meth)acrylates such as trifluoroethyl(meth) acrylate, pentafluoropropyl(meth)acrylate and heptafluorobutyl(meth)acrylate;

siloxanyl compounds such as trimethylsiloxanyldimethyl-silylpropyl(meth)acrylate, tris(trimethylsiloxanyl)silylpropyl(meth)acrylate, and di(meth)acryloylpropyldimethylsilyl ether;

hydroxyalkyl(meth)acrylates such as 2-hydroxyethyl(meth)acrylate, 2-hydroxypropyl(meth)acrylate and 3-hydroxypropyl(meth)acrylate;

amine-containing (meth)acrylates such as dimethylaminoethyl(meth)acrylate, diethylaminoethyl(meth)acrylate and t-butylaminoethyl(meth)acrylate;

unsaturated carboxylic acid hydroxyalkyl esters such as 2-hydroxyethyl crotonate, 2-hydroxypropyl crotonate and 2-hydroxypropyl cinnamate;

unsaturated alcohols such as (meth)allyl alcohol;

unsaturated (mono)carboxylic acids such as (meth)acrylic acid, crotonic acid and cinnamic acid;

epoxy-group-containing (meth)acrylic acid esters, and the mono and diesters thereof, such as glycidyl(meth)acrylate, glycidyl α-ethylacrylate, glycidyl α-n-propylacrylate, glycidyl α-n-butylacrylate, 3,4-epoxybutyl(meth)acrylate, 6,7-epoxyheptyl(meth)acrylate, 6,7-epoxyheptyl α-ethylacrylate, o-vinylbenzyl glycidyl ether, m-vinylbenzyl glycidyl ether, p-vinylbenzyl glycidyl ether, glycidyl β-methyl(meth)acrylate, glycidyl β-ethyl(meth)acrylate, glycidyl β-propyl(meth)acrylate, glycidyl β-methyl-α-ethylacrylate, 3-methyl-3,4-epoxybutyl(meth)acrylate, 3-ethyl-3,4-epoxybutyl(meth)acrylate, 4-methyl-4,5-epoxypentyl(meth)acrylate, 5-methyl-5,6-epoxyhexyl(meth)acrylate, glycidyl β-methyl(meth)acrylate and 3-methyl-3,4-epoxybutyl(meth)acrylate; as well as N-alkyl substituted (meth)acrylamides such as N,N-dimethylacrylamide and N-isopropylacrylamide;

unsaturated polycarboxlic acids (anhydrides) such as N-methylolacrylamide, N-methylomethacrylamide, N-vinylpyrrolidone (anhydrous) maleic acid, fumaric acid, (anhydrous) itaconic acid and citraconic acid, vinyl chloride and vinyl acetate.

The solvent for the above-described polymer-containing solution is not particularly limited, as long as it is a selective solvent which is a good solvent having affinity only with a given component contained in the polymer to be used, and is a poor solvent with other given components. The solvent can, however, be determined depending on the supercritical fluid which is simultaneously used. Examples of such a solvent include the following:

water; alcohols such as methanol, ethanol and 2-propanol;

ketones such as acetone and methylethylketone, as well as ethers, esters, aromatics and the like.

An aqueous solvent can also be added, including the following:

polyalcohols such as ethylene glycol, diethylene glycol, triethylene glycol, polyethylene glycol, propylene glycol, polypropylene glycol and glycerin;

polyalcohol ethers such as ethylene glycol monomethylether, ethylene glycol monoethylether, ethylene glycol monobutylether, diethylene glycol monoethylether and diethylene glycol monobutylether; and nitrogen-containing solvents such as N-methyl-2-pyrrolidone, substituted pyrrolidone and triethanolamine. These solvents can be used singly or in the form of a mixture.

The pigment complex in the present invention is a pigment fine particle coated with a polymer. The particle size of the pigment complex is 300 nm or less, and is preferably in a range of between 1 and 100 nm.

The pigment-containing composition in the present invention is a solution containing pigment particles dispersed in a solvent in a pigment complex state. The pigment complex content is between 0.1 and 60% by weight, and is preferably in a range of between 0.5 and 40% by weight. The particle size of the pigment complex in the pigment-containing composition is 300 nm or less, and is preferably in a range of between 1 and 100 nm.

Figure 2:
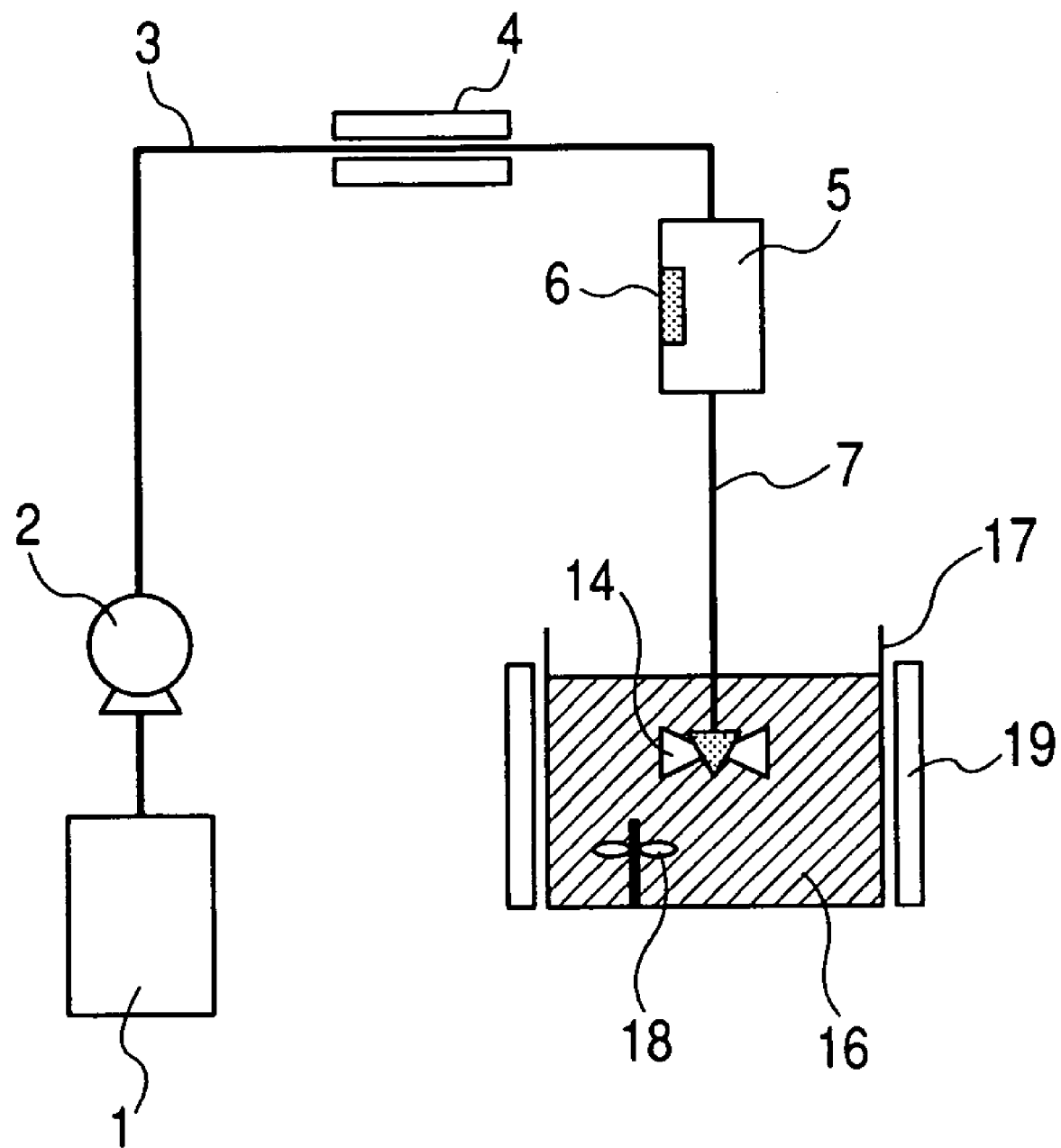
FIG. 2 is a schematic diagram illustrating another example of a pigment complex production apparatus which realizes the process according to the present invention.
Figure 3:
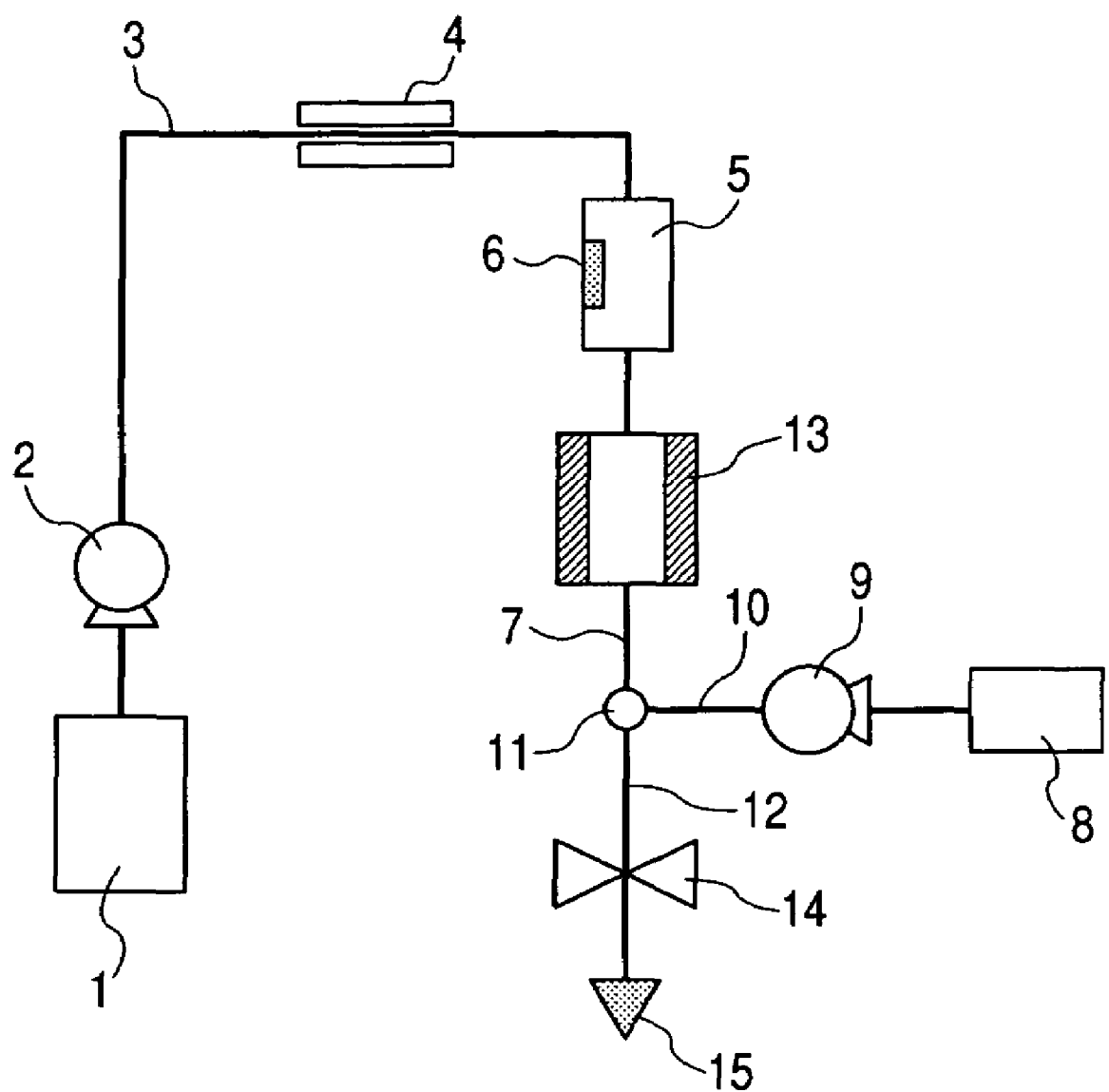
FIG. 3 is a schematic diagram illustrating still another example of a pigment complex production apparatus which realizes the process according to the present invention.

A production apparatus used in the dispersion treatment according to the present invention having left a supercritical state will now be explained. FIGS. 1 to 3 are schematic diagrams illustrating structural examples of a pigment complex production apparatus.

In FIG. 1, reference numeral 1 denotes a solvent tank which contains the solvent that is used as the supercritical fluid or subcritical fluid. This solvent is fed at high pressure to a pressure-resistant vessel 5 via a solvent supply pipe 3 by a first pump 2. Midway through being fed by the solvent supply pipe 3, the solvent is preheated to a desired temperature by a pre-heater 4 provided at a position between the first pump 2 and the pressure-resistant vessel 5. The solvent fed to the pressure-resistant vessel 5 is heated to a desired supercritical or subcritical state temperature by a heater (not shown) which is attached around the circumference of the pressure-resistant vessel. Pigment 6, which has been charged in advance into the pressure-resistant vessel 5, is dissolved, and the fluid in which this pigment is dissolved is sent to a mixer 11 via a pigment fluid supply pipe 7.

Reference numeral 8 denotes a dispersing agent tank which contains a polymer-containing solution. The polymer-containing solution is fed to the mixer 11 via a dispersing agent supply pipe 10 by a second pump 9. In the mixer 11, the high-temperature high-pressure pigment fluid being fed from the pigment fluid supply pipe 7 is mixed with a solution containing the low-temperature polymer being fed from the dispersing agent supply pipe 10. The resulting mixed solution is fed into a mixed solution supply pipe 12, and cooled by a cooling part 13. The cooled mixed solution is then fed to a pigment complex collection aperture 15 via a back-pressure regulating valve 14. The fluid pressure between the first pump 2 and the back-pressure regulating valve 14, and that between the second pump 9 and the back-pressure regulating valve 14, is controlled to a predetermined pressure using the back-pressure regulating valve.

When the production apparatus illustrated in FIG. 1 is employed, mainly pigment fine particle is precipitated in the mixer 11. However, along with precipitation, the desired pigment complex, which has been at least partially stabilized by the polymer, can be obtained.

The apparatus illustrated in FIG. 2 is a preferable apparatus for releasing the above-described fluid containing the dissolved pigment into the polymer-containing solution.

In FIG. 2, since the same reference numbers are given for the same structural units as those in FIG. 1, explanation thereof is omitted.

In the same manner as the production apparatus example of FIG. 1, in the production apparatus of FIG. 2, solvent dissolves pigment that is in a supercritical state or subcritical state, and the resulting fluid is fed into a pigment fluid supply pipe 7. In the production apparatus of FIG. 2, once pressure has been lowered to atmospheric pressure by the back-pressure regulating valve 14, the polymer-containing solution 16 contained in the mixing vessel 17 is directly ejected. So that the ejected pigment solution is promptly ejected into the polymer-containing solution, the mixing vessel 17 may be provided with a stirrer 18. The mixing vessel 17 is also preferably provided with a cooling part 19 so that even if the pigment fluid is continuously ejected, cooling of the polymer-containing solution 16 to a prescribed temperature can be maintained.

The apparatus illustrated in FIG. 3 is a preferable apparatus for bringing the fluid containing the dissolved pigment into contact with the polymer-containing solution once the fluid has left a supercritical or subcritical state.

In FIG. 3, since the same reference numbers are given for the same structural units as those in FIG. 1, explanation thereof is omitted.

In the production apparatus illustrated in FIG. 3, the mixer 11 is provided after the cooling part 13. For this reason, even when a supercritical fluid having a high critical temperature is used, the mixing of the polymer-containing solution with the pigment solution does not result in a high temperature. That is, decomposition of the polymer by heat can be prevented.

The production apparatus for a pigment complex according to the present invention is in no way limited as long as the apparatus has a function for mixing a pigment dissolved in a supercritical liquid with a polymer-containing solution. In addition to the above-described three kinds of apparatus, the use of other apparatuses, for instance an apparatus which feeds a solution in which the pigment has been dissolved in slurry form to a pressure vessel 5, is possible.

To increase the dispersion stability of the particles, in the present invention the polymer-containing solution can be made to contain a surfactant. Either nonionic or ionic surfactants can be employed. In order to use the electrical repulsion between particles, an ionic surfactant is preferably employed. Ionic surfactants which can be employed in the present invention may be a cationic surfactant or an anionic surfactant. Examples of anionic surfactants include carboxylate or sulfate ester salt active agents, sulfonate active agents, phosphate ester salt active agents, dithiophosphate ester salts and the like. Ionic surfactants of the present invention are not limited to these examples.

As described above, in the present invention, a pigment complex dispersed liquid can be produced, which can be applied as a pigment-containing composition for an ink composition, a color filter composition or other such composition. However, applications are not limited to these examples as long as the composition contains a pigment. Further examples will be illustrated below in which a pigment-containing composition is employed as an ink composition.

Although not particularly limited, the solvent contained in the composition refers to a medium which can dissolve, suspend and disperse the components contained in the composition. The present invention includes solvents such as organic solvents, for example various linear, branched or cyclic aliphatic hydrocarbons, aromatic hydrocarbons, and heteroaromatic hydrocarbons, aqueous solvents, water and the like. In particular, in the composition according to the present invention, water or an aqueous solvent is preferably used.

Examples of aqueous solvents include:

polyalcohols such as ethylene glycol, diethylene glycol, triethylene glycol, polyethylene glycol, propylene glycol, polypropylene glycol and glycerin;

polyalcohol ethers such as ethylene glycol monomethylether, ethylene glycol monoethylether, ethylene glycol monobutylether, diethylene glycol monoethylether and diethylene glycol monobutylether; and nitrogen-containing solvents such as N-methyl-2-pyrrolidone, substituted pyrrolidone and triethanolamine.

For ink applications, to speed up the drying of the paper, a monohydric alcohol such as methanol, ethanol and isopropylalcohol can also be used.

The above-described solvent content is preferably used in a range of from 20 to 95 wt % of the total weight of the composition. More preferable is in a range of from 30 to 90 wt %. A pigment according to the present invention which is used in an ink is preferably from 0.1 to 50 wt % of the weight of ink. If the pigment content is less than 0.1 wt %, fuller image density might not be achieved. If the pigment content is more than 50 wt %, in some cases viscosity increases too much. A more preferable range is from 0.5 to 30 wt %.

A composition obtained in accordance with the process according to the present invention can be added as necessary with various additives, auxiliary agents and the like. It is also possible to use a resin which has both hydrophilic and hydrophobic parts. Examples of additives which can be added into the composition according to the present invention include cross-linking agents, acid-forming agents, polymerization initiators and the like which have been activated by application of heat or electromagnetic waves. Further examples of additives which can be added into the composition according to the present invention include, for example, the following:

a pH modifier for stabilizing the ink and obtaining stability with the ink piping in the recording device;

a penetrating agent which hastens penetration of the ink into the recording medium and which speeds up the apparent drying;

a fungicide which prevents the occurrence of mildew in the ink;

a chelating agent which seals metal ions in the ink and prevents the precipitation of metals at the nozzle and the precipitation of insoluble matter in the ink;

a defoaming agent for preventing the occurrence of foam during recycling of the recording solution, transport or recording solution production; an antioxidant; a viscosity modifier; a conductant; an ultraviolet absorbent; and a coloring agent such as an aqueous dye, a disperse dye or an oil-soluble dye.

EXAMPLES

The present invention will now be described in more detail with reference to Synthesis Examples and Working Examples. However, the present invention is not limited to these examples.

Polymer Synthesis Example 1

Synthesis of an AB diblock copolymer consisting of 2-methoxyethylvinylether (MOVE) and 2-ethoxyethylvinylether (EOVE)

Poly((2-methoxyethylvinylether)-b-(2-ethoxyethylvinylether))

(here, "b" is a reference character denoting the fact of being a block copolymer) was synthesized according to the following procedures by a living cationic polymerization process.

After the contents of a glass vessel equipped with a three-way stopcock had been purged with nitrogen, the vessel was heated to 250° C. under a nitrogen gas atmosphere to remove water adsorbed therein. The system was returned to room temperature, then 12 millimoles of EOVE, 16 millimoles of ethyl acetate, 0.1 millimoles of 1-isobutoxyethylacetate and 11 ml of toluene were added, and the resulting reaction system was further cooled. Once the system internal temperature had reached 0° C., 0.2 millimoles of ethylaluminum sesquichloride (equimolar mixture of diethylaluminum chloride and ethylaluminum dichloride) was added to the system to initiate polymerization, whereby component A of the AB block copolymer was synthesized. Molecular weight was monitored on a time-divided basis using gel permeation chromatography (GPC), whereby it was confirmed that polymerization of component A was complete.

Next, 18 millimoles of MOVE was added to a system to carry out synthesis of component B. GPC monitoring was used to confirm that polymerization of component B was complete. Termination of the polymerization reaction was carried out by adding a 0.3 mass % aqueous ammonia/methanol solution into the system. The reaction mixed solution was diluted using dichloromethane, and the resulting solution was washed with 0.6 M hydrochloric acid (3 times) and then with distilled water (3 times). An evaporator was then used to concentrate and solidify the obtained organic phase, and this resulting product was subjected to vacuum drying to thereby yield the desired MOVE-EOVE diblock copolymer. Identification of the compound was performed using NMR and GPC, whereby both of these techniques provided the desired polymer spectrum. (Mn=57,700, Mw/Mn=1.23)

Polymer Synthesis Example 2

Synthesis of an AB diblock copolymer consisting of styrene (St) and acrylic acid (AA)

Poly(Styrene)-b-poly(tert-butylacrylate), a precursor of poly(styrene)-b-poly(acrylic acid), was synthesized according to the following procedures by an atom transfer radical polymerization process which is one type of living radical polymerization.

Copper bromide (1.7 millimoles), 1.7 millimoles of pentamethyldiethylenetriamine, 1.7 millimoles of 1-phenylethylbromide and 425 millimoles of styrene (St) were mixed together. Once oxygen present in the resulting solution had been purged with nitrogen, a reaction was carried out at 100° C. The reaction was carried out while confirming the monomer conversion using gas chromatography. The reaction was terminated by rapid cooling with liquid nitrogen. The molecular weight of the obtained polystyrene was confirmed using GPC to be Mn=18,900 and Mw/Mn=1.19.

Next, 0.4 millimoles of the obtained polystyrene having bromine on its ends, 0.2 millimoles of copper bromide, 0.2 millimoles of pentamethyldiethylenetriamine, 160 millimoles of tert-butylacrylate and 10 ml of acetone were mixed together, and the resulting solution was purged with nitrogen. A reaction was carried out at 60° C., after which the solution was rapidly cooled using liquid nitrogen, whereby the reaction was terminated. After purification by reprecipitation in methanol, the molecular weight of the obtained (styrene)-b-poly(tert-butylacrylate) was confirmed by GPC to be Mn=47,800 and Mw/Mn=1.28.

The obtained precursor block copolymer was dissolved in dichloromethane, and the resulting solution was then charged with trifluoroacetic acid. This solution was subjected to a hydrolysis reaction at room temperature for 24 hours, whereby the poly(tert-butylacrylate) segments were converted to poly(acrylic acid). Results of NMR and FT-IR structural analysis of the hydrolysis product confirmed that the poly(tert-butylacrylate) segments had been quantitatively converted to poly(acrylic acid), whereby the desired product, the diblock copolymer poly(St)-b-poly(AA) was obtained.

Polymer Synthesis Example 3

Synthesis of a graft copolymer having a methylmethacrylate (MMA) as a main chain component and poly(ethyleneglycol) as a side chain component Poly(MMA)-g-poly(ethyleneglycol) (here, "g" is a reference character denoting the fact of being a graft copolymer) was synthesized according to the following procedures by an atom transfer radical polymerization process which is one type of living radical polymerization.

0.1 millimole of copper bromide, 0.1 millimoles of pentamethyldiethylenetriamine, 0.2 millimoles of paratoluene sulfonyl chloride, 68 millimoles of MMA, 3.4 millimoles of poly(ethyleneglycol)methylether methacrylate (Mn=1,100) and 10 ml of dimethylformamide were mixed together. Once oxygen present in the resulting solution had been purged with nitrogen, a reaction was carried out at 40° C. The reaction was carried out while confirming the monomer conversion using gas chromatography. The reaction was terminated by rapid cooling with liquid nitrogen, to thereby yield the desired product, poly(MMA)-g-poly(ethyleneglycol). Identification of the compound was performed using NMR and GPC, whereby both of these techniques provided the desired polymer spectrum. (Mn=39,300, Mw/Mn=1.17)

Example 1

A pigment complex was produced using the apparatus illustrated in FIG. 1. The interior of a 10 ml capacity pressure-resistant vessel 5 was pre-packed with 0.5 g of copper phthalocyanine. Stainless steel filters were attached to the front and rear of the pressure-resistant vessel 5 to stop pre-dissolved pigment from flowing out. Water was fed from a tank 1 via a supply pipe 3 to the pressure-resistant vessel 5 at a rate of 5 ml/min. The resulting solution was made to be a supercritical state at 25 MPa and 400° C. This supercritical solution was flowed through the vessel, to thereby carry out the step of dissolving the pigment in a supercritical fluid.

Next, an aqueous solution (10 mg/ml) containing the diblock copolymer obtained in Synthesis Example 1, poly((2-methoxyethylvinyl ether)-b-(2-ethoxyethylvinyl ether)), was fed into the mixer 11 at a rate of 5 ml/min, and mixed with the supercritical fluid in which the pigment was dissolved. The temperature after mixing was 150° C. Once the temperature of the dispersed liquid had been thoroughly cooled to room temperature by the cooling pipe 13, the dispersed liquid was collected at the collection aperture 15. The content of the pigment contained in the dispersed liquid was 7 mg/ml.

Measurement of the particle size of the pigment complex contained in this pigment fine particle dispersed liquid using a dynamic light scattering spectrophotometer manufactured by Otsuka Electronics Co., Ltd. (DLS-7000) showed that the average particle size was 25 nm and the particle size range had a narrow distribution of 15 to 50 nm. Regarding dispersion stability, the dispersed liquid was left at room temperature, where observation of particle agglomeration/sedimentation did not confirm any sedimentation even after being left for one month.

Example 2

The present Example is an example of a pigment complex being produced by direct release of a supercritical fluid in which a pigment has been dissolved into a polymer-containing solution. Using the supercritical apparatus illustrated in FIG. 2, preparation was carried out under the same conditions as in Example 1, except that supercritical water in which copper phthalocyanine was dissolved was directly ejected into an aqueous solution 16 containing the diblock copolymer obtained in Synthesis Example 1, poly((2-methoxyethylvinyl ether)-b-(2-ethoxyethylvinyl ether)). The average particle size of the particles in the dispersed liquid was 30 nm and the particle size range was narrow at 15 to 65 nm. In addition, no sedimentation was observed even after leaving the solution for one month.

Example 3

The present Example is an example of a pigment complex being produced by subjecting a supercritical fluid in which a pigment has been dissolved to a cooling step, and then contacting the cooled fluid with a polymer-containing solution. Using the supercritical apparatus illustrated in FIG. 3, a pigment complex which had left a supercritical state was produced under exactly the same conditions as in Example 1, except that after cooling by the cooling part 13, a copper phthalocyanine dispersed solution was mixed with a polymer-containing aqueous solution. The average particle size of the particles in the dispersed liquid was 55 nm and the particle size range was narrow at 35 to 80 nm. In addition, no sedimentation was observed even after leaving the solution for one month.

Example 4

The present Example is an example of a pigment complex being produced using the same apparatus as in Example 1, but using a block copolymer different from that of Example 1. A pigment complex which had left a supercritical state was produced under the same conditions as in Example 1, except that the diblock polymer obtained in Synthesis Example 2, poly(St)-b-poly(AA) was used as the polymer in the polymer-containing solution. The average particle size of the particles in the dispersed liquid was 30 nm and the particle size range was narrow at 20 to 50 nm. In addition, no sedimentation was observed even after leaving the solution for one month.

Example 5

The present Example is an example of a pigment complex being produced using the same apparatus as in Example 1, and using a graft copolymer. A pigment complex which had left a supercritical state was produced under the same conditions as in Example 1, except that the graft polymer obtained in Synthesis Example 3, poly(MMA)-g-poly(ethyleneglycol) was used as the polymer in the polymer-containing solution. The average particle size of the particles in the dispersed liquid was 30 nm and the particle size range was narrow at 15 to 50 nm. In addition, no sedimentation was observed even after leaving the solution for one month.

Example 6

The present Example is an example of a pigment complex being produced using a subcritical fluid in place of a supercritical fluid, but using the same apparatus and the same polymer as in Example 4. A pigment complex which had left a subcritical state was produced under the same conditions as in Example 4, except that in contrast to Example 4, after the solution had reached a subcritical state at 25 MPa and 250° C., the solution was passed through the pressure-resistant vessel 5 to dissolve the pigment. The average particle size of the particles in the dispersed liquid was 55 nm and the particle size range was 25 to 95 nm. In addition, no sedimentation was observed even after leaving the solution for one month.

Example 7

The present Example is an example of a pigment-containing complex being produced. Ion-exchange water (73 parts by weight) was charged with 12 parts by weight of the pigment complex obtained in Example 1 and 15 parts by weight of diethyleneglycol. The resulting solution was subjected to pressure-filtering by passing the solution through a 1 µm filter, to thereby yield a pigment-containing composition (ink composition). The dispersibility of the pigment complex was good.

Comparative Example 1

Using the same apparatus as in Example 1, a pigment complex which had left a supercritical state was produced under the same conditions as in Example 1, except that a solution that did not contain a polymer was used in place of the polymer-containing solution. After being left to stand for one week, sediment could be seen in the dispersed liquid. Measurement of particle size diameter showed both a 50 nm peak from primary particles and a 30 µm peak from agglomerated particles, whereby it was confirmed that the primary particles had formed an agglomeration.

According to the present invention, a pigment complex and pigment-containing composition can be produced having excellent dispersion stability and in which the particle size is small and uniform, whereby a printed image can be provided excellent in tinting strength and having vibrant colors.

This application claims priority from Japanese Patent Application No. 2004-275590 filed on Sep. 22, 2004, which is hereby incorporated by reference herein.

What is claimed is:

1. A process for producing a pigment complex for inkjet printing comprising the steps of:
   dissolving a phthalocyanine pigment with water in a supercritical state or subcritical state fluid; and
   contacting the fluid containing the dissolved pigment with a polymer-containing solution,
   wherein the polymer is a block copolymer or a graft copolymer,
   wherein the block copolymer or graft copolymer has a polydispersity index Mw/Mn of not more than 1.7, and
   wherein the particle size of the pigment complex is in a range from 1 to 100 nm.

2. The process for producing a pigment complex for inkjet printing according to claim 1, wherein the contacting step comprises releasing the fluid containing the dissolved pigment into the polymer-containing solution.

3. The process for producing a pigment complex for inkjet printing according to claim 1, wherein the contacting step is carried out having undergone a step in which, after the step for dissolving a phthalocyanine pigment with water in a supercritical state or subcritical state fluid, the fluid containing the dissolved pigment is made to leave the supercritical state or subcritical state.

4. The process for producing a pigment complex according to claim 1, wherein the subcritical state is a state in which only one of either temperature or pressure has reached critical temperature or critical pressure, while the other has not reached critical temperature or critical pressure.

5. The process for producing a pigment complex according to claim 1, wherein the subcritical state is a state in which neither of temperature or pressure has reached critical temperature or critical pressure, but at least one of temperature or pressure has nearly reached critical temperature or critical pressure.

6. The process for producing a pigment complex for inkjet printing according to claim 1, wherein at least one component of the block copolymer or graft copolymer has affinity with a solvent of the polymer-containing solution.

7. A process for producing a pigment-containing composition for inkjet printing comprising the steps of:

dissolving a phthalocyanine pigment with water in a supercritical state or subcritical state fluid; and contacting the fluid containing the dissolved pigment with a polymer-containing solution, wherein the polymer is a block copolymer or a graft copolymer, wherein the block copolymer or graft copolymer has a polydispersity index Mw/Mn of not more than 1.7, wherein the particle size of the pigment complex is in a range from 1 to 100 nm.

8. The process for producing a pigment-containing composition for inkjet printing according to claim 7, wherein the contacting step comprises releasing the fluid containing the dissolved pigment into the polymer-containing solution.

* * * * *